United States Patent
Odeh (10) Patent No.: US 8,664,570 B2
(45) Date of Patent: Mar. 4, 2014

(54) VEHICLE WINDOW HAVING BUS BAR(S) OF CONDUCTIVE BLACK FRIT

(75) Inventor: Sam Odeh, Maumee, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 1018 days.

(21) Appl. No.: 10/956,371

(22) Filed: Oct. 4, 2004

(65) Prior Publication Data

US 2006/0081581 A1    Apr. 20, 2006

(51) Int. Cl.
   *H05B 3/84*    (2006.01)
(52) U.S. Cl.
   USPC ............................ 219/203; 219/522; 219/541
(58) Field of Classification Search
   USPC ........................ 219/203, 541, 522, 202, 219
   See application file for complete search history.

(56) References Cited

U.S. PATENT DOCUMENTS

| | | | |
|---|---|---|---|
| 4,728,781 A | 3/1988 | Donley et al. | |
| 4,770,685 A | 9/1988 | Boaz | |
| 4,910,380 A * | 3/1990 | Reiss et al. | 219/203 |
| 5,066,112 A | 11/1991 | Lynam et al. | |
| 5,328,753 A | 7/1994 | Boaz | |
| 6,163,303 A | 12/2000 | Nagy | |
| 6,472,636 B1 | 10/2002 | Baldwin | |
| 6,490,788 B2 | 12/2002 | Carter et al. | |
| 6,492,619 B1 * | 12/2002 | Sol | 219/203 |
| 6,559,419 B1 * | 5/2003 | Sol et al. | 219/203 |
| 6,598,426 B2 | 7/2003 | Vandal et al. | |
| 6,625,875 B2 | 9/2003 | Sol | |
| 6,734,396 B2 | 5/2004 | Sol et al. | |
| 7,009,156 B2 * | 3/2006 | Maeuser | 219/543 |
| 7,026,577 B2 * | 4/2006 | Maeuser et al. | 219/203 |
| 2002/0041424 A1 * | 4/2002 | Lynam | 359/275 |

FOREIGN PATENT DOCUMENTS

| | | |
|---|---|---|
| DE | 196 05 617 | 8/1997 |
| GB | 2 209 174 | 5/1989 |
| WO | WO03/051088 A2 * | 6/2003 |
| WO | WO03/056880 A2 * | 7/2003 |

OTHER PUBLICATIONS

German Office Action (w/English translation thereof) dated Apr. 23, 2008.

* cited by examiner

*Primary Examiner* — Brian Jennison
(74) *Attorney, Agent, or Firm* — Nixon & Vanderhye P.C.

(57) ABSTRACT

A heatable vehicle window includes a substrate that supports a heatable conductor. The heatable conductor may be in the form of a grid of conductors, or alternatively a substantially continuous sheet. First and second conductive bus bars are electrically connected to the heatable conductor. The first and/or second bus bars are each conductive, and include black color pigment, so that the first and/or second bus bars are substantially black in color.

17 Claims, 7 Drawing Sheets

VEHICLE WINDOW HAVING BUS BAR(S) OF CONDUCTIVE BLACK FRIT

This application relates to a vehicle window including an electrical structure such as a heatable coating/layer or antenna to which bus bar(s) are electrically connected. In certain example embodiments, the bus bar(s) are made of a conductive opaque material in order to avoid certain processing steps that have been conventionally used in certain instances.

BACKGROUND OF THE INVENTION

Vehicle windows with electrical structures are known in the art. For example, vehicle windows such as backlites (i.e., rear windows) or windshields often have defoggers/defrosters, which include a conductive coating that is used to defog and/or defrost the window. The conductive coating for defogging/defrosting may take the form of a continuous substantially transparent coating having at least one conductive layer that is formed across a substantial portion of the window, or alternatively the conductive coating may take the form of a plurality of spaced apart parallel strips (heater bars), which extend across a significant portion of the window. In either case, there is a need to supply electrical current to the coating so that the coating is heated and defrosting and/or defogging can occur.

In order to provide electrical current to the coating, conductive bus bars are typically used. The conductive bas bars are typically made of silver (Ag) based frit and are thus electrically conductive. The silver frit bus bars are typically applied in their natural color, in rather wide bands used to convey sufficient current to/from the conductive coating.

Unfortunately, however, the silver frit of the bus bars tends to tarnish in an uneven manner over time to an undesirable brownish color. Wide bands of brownish colored material (tarnished silver frit bus bars) are unsightly, and aesthetically displeasing. Thus, those in the art have typically tried to hide such bus bars from view in the following manner.

Conventionally, a three pass process has been used to provide silver frit bus bars on a heatable window and then to hide the bus bars from view. First, in making a vehicle backlite for example, black enamel or paint is applied to the interior peripheral surface of the glazing (or window) in a strip proximate the periphery thereof. The purpose of this black enamel strip is to hide from view (from the vehicle exterior) the edge of the sheet metal window frame proximate the edge of the glazing, adhesive used to subsequently mount the glazing in the window frame, and/or the bus bars to be subsequently deposited. Second, after the enamel has been dried, the silver (Ag) based conductive frit is printed over the black enamel on the interior surface of the glazing, and is dried, so as to form bus bars located at least proximate the edge(s) of the glazing. The silver frit based bus bars are in electrical contact with the conductive coating, and are provided in order to supply current to the coating so that it can be heated. The conductive coating may have been formed prior to the formation of the bus bars, or alternatively at the same time the bus bars are formed using the same silver based frit to form a heat grid. Third, another black enamel strip is applied to the interior surface of the glazing (proximate only the periphery of the glazing) over the bus bars in order to hide the bus bars from view when looking from the interior of the vehicle.

While the process described above results in a vehicle window in which the silver frit bus bars are hidden from view, from both the inside and outside of the vehicle, the process is undesirable in that black layers are required to be applied on both the interior and exterior surfaces of the glazing/window adjacent the periphery thereof in separate steps.

Figure 1:
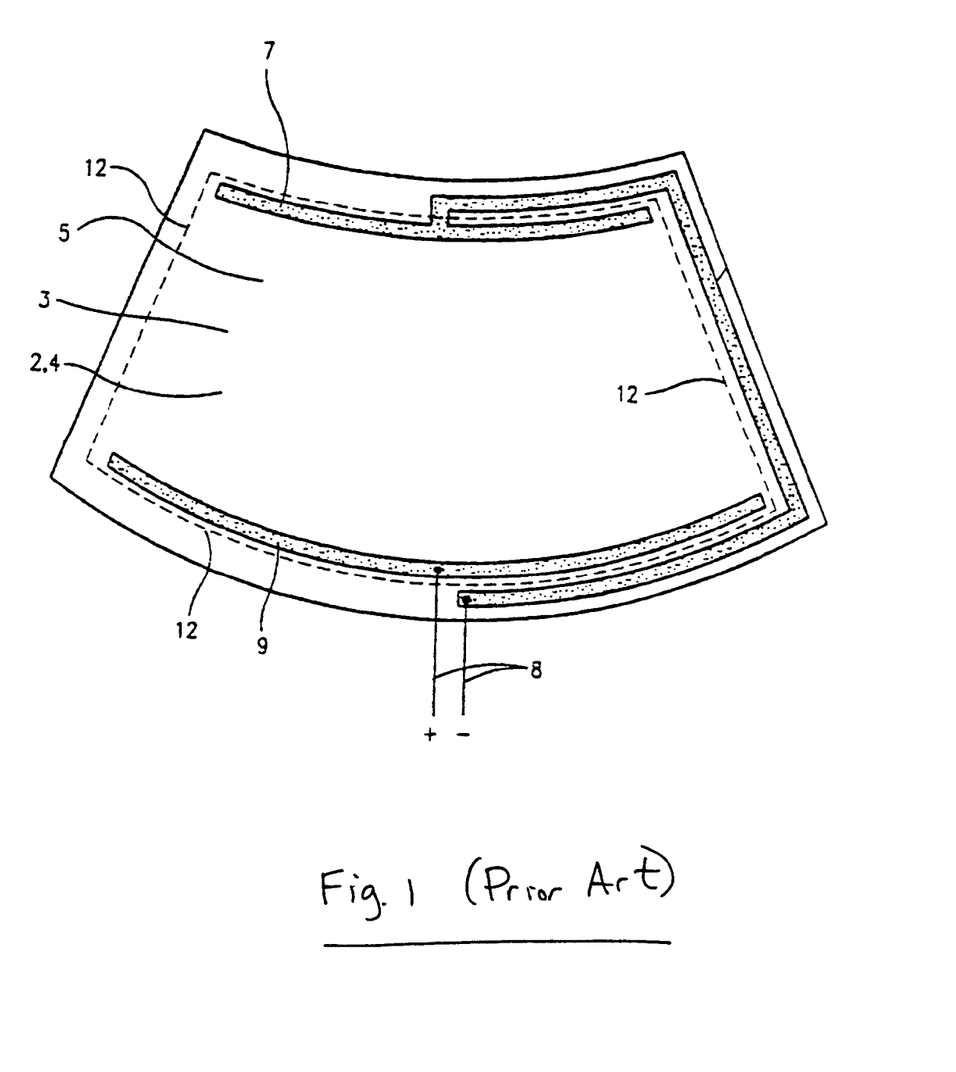
FIG. 1 is a plan view of a conventional heatable vehicle windshield.
Figure 2:
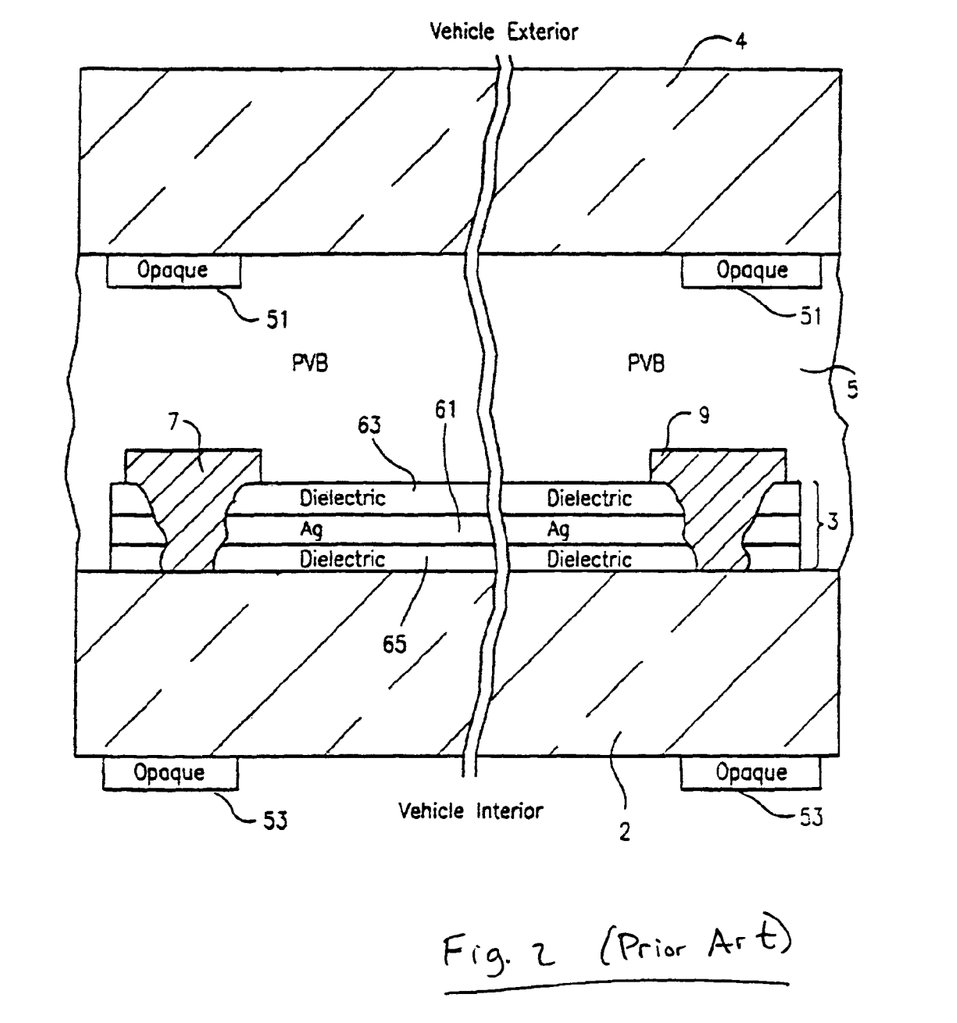
FIG. 2 is a cross sectional view of peripheral portions of the windshield of FIG. 1.

Another prior art window is illustrated in FIGS. 1-2 (see also U.S. Pat. No. 6,625,875, the entire disclosure of which is hereby incorporated herein by reference). Referring to FIGS. 1-2, the windshield includes a conductive coating 3 having at least one conductive layer formed on glass substrate 2. In this example instances, the conductive heatable coating 3 includes a conductive layer 61 provided between at least first and second dielectric layers 63, 65. Edge deletion line 12 indicates the edge of the conductive heatable coating 3. Conductive silver frit bus bars 7, 9 are formed so as to be electrically connected to the transparent heatable coating 3. Electrical leads 8 are connected to the bus bars. Glass substrate 2 is laminated to glass substrate 4 via PVB interlayer 5 in a known manner. Black paint 51 is provided on the outer substrate 4 in order to hide the bus bars 7, 9 from view from the outside of the vehicle, whereas black paint 53 is provided on the interior substrate 2 in order to hide the bus bars 7, 9 from view from the interior of the vehicle. While silver frit bus bars 7 and 9 are hidden from view, from both the inside and outside of the vehicle, the process is undesirable in that black paint layers are required to be applied to both the interior and exterior substrates adjacent the periphery thereof in separate steps.

It will be appreciated from the above that there exists a need in the art for a vehicle window, and method of making the same, in which the conductive bus bars can more easily and/or efficiently be hidden from view.

BRIEF SUMMARY OF EXAMPLES OF THE INVENTION

Certain example embodiments of this invention relate to a vehicle window including an electrical structure such as a heatable coating/layer or antenna to which bus bar(s) are electrically connected. In certain example embodiments, the bus bar(s) are made of a conductive opaque material in order to avoid certain processing steps that have been conventionally used in certain instances.

In certain example embodiments of this invention, one or more of the conductive bus bars is/are made of or comprises conductive black frit inclusive material. In certain example embodiments, the conductive black frit inclusive material may include a material such as silver or another suitable metal to make it electrically conductive, in addition to the frit.

Because the bus bar(s) are of conductive black frit inclusive material, they are difficult to see from the interior and/or exterior of the vehicle and blend in visually to the overall window. For instance, the opaque black bus bar(s) would blend in visually with a possible black painted non-conductive frit strip painted on the exterior surface of the window proximate the periphery thereof, or with a non-conductive black frit strip painted on the interior surface of the window under and/or over the bus bars. Thus, there is no need for black paint to be provided on the interior periphery surface of the window both over and under the bus bars in certain example embodiments, because there is no significant need to hide the bus bar(s) from view. Thus, in certain example non-limiting instances, a processing step associated with forming a black paint layer/strip may be eliminated.

In certain example embodiments of this invention, the conductive heatable coating (continuous in form, or alternatively in the form of a grid or matrix) may be deposited and formed prior to the deposition and formation of the bus bars. However, in other example embodiments of this invention, the conductive heatable coating may be formed simultaneously with the bus bars out of the same material. In such example embodiments, a single pass may be used to form both the conductive black frit bus bars and a conductive heatable grid of the same material on a surface of the glazing. The bus bars are typically located on a major surface (e.g., interior major surface) of the window proximate the periphery thereof, although they may be located in other possible locations in certain situations. The bus bars may also be used to function as a radio and/or cell phone antenna in certain example embodiments of this invention.

In certain example embodiments of this invention, there is provided a heatable vehicle window, comprising a glass substrate supporting at least one heatable conductor; first and second conductive bus bars electrically connected to the heatable conductor; and wherein the first bus bar and/or the second bus bar comprises conductive material and frit, and is black in color.

In other example embodiments of this invention, there is provided a heatable vehicle window comprising a heatable conductor; first and second conductive bus bars electrically connected to the heatable conductor; and wherein the first and second bus bars each comprise a conductive material and black color pigment, so that each of the first and second bus bars is substantially black in color.

DETAILED DESCRIPTION OF CERTAIN EXAMPLE EMBODIMENTS OF THE INVENTION

Referring now more particularly to the accompanying drawings in which like reference numerals indicate like parts throughout the several views.

Certain example embodiments of this invention relate to a vehicle window including an electrical structure such as a heatable coating/layer or antenna to which bus bar(s) are electrically connected. In certain example embodiments, one or both of the bus bars (and optionally the electrical structure) are made of a conductive opaque material in order to avoid certain processing steps that have been conventionally used in certain instances. For example, a processing step associated with forming a black paint layer/strip on the interior surface of the window may be eliminated in certain example embodiments.

Figure 3A:
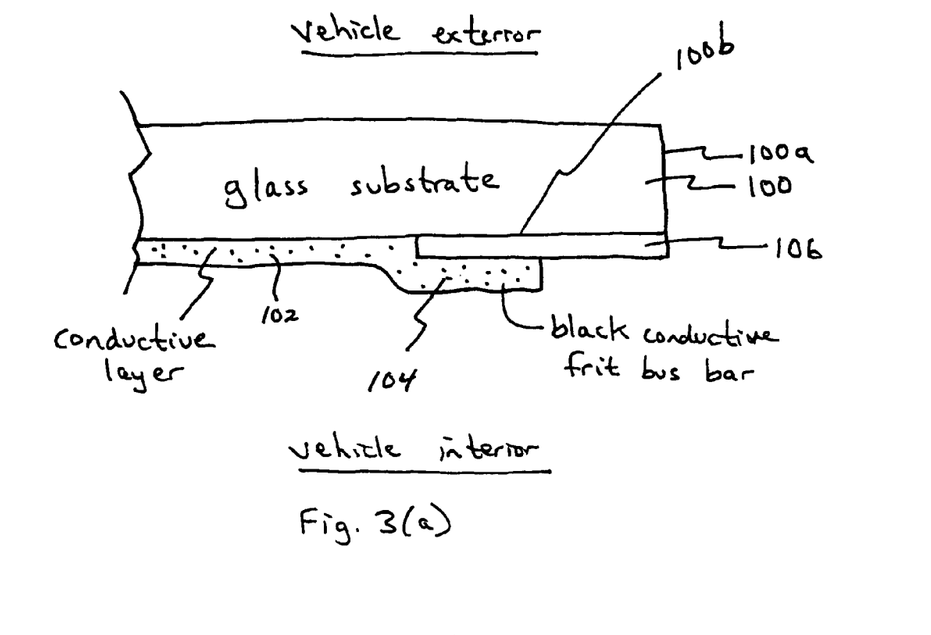
FIGS. 3(a)-3(c) are cross sectional views of monolithic vehicle windows (e.g., backlite, windshield, sidelite, sunroof, or the like) according to example embodiments of this invention.
Figure 5:
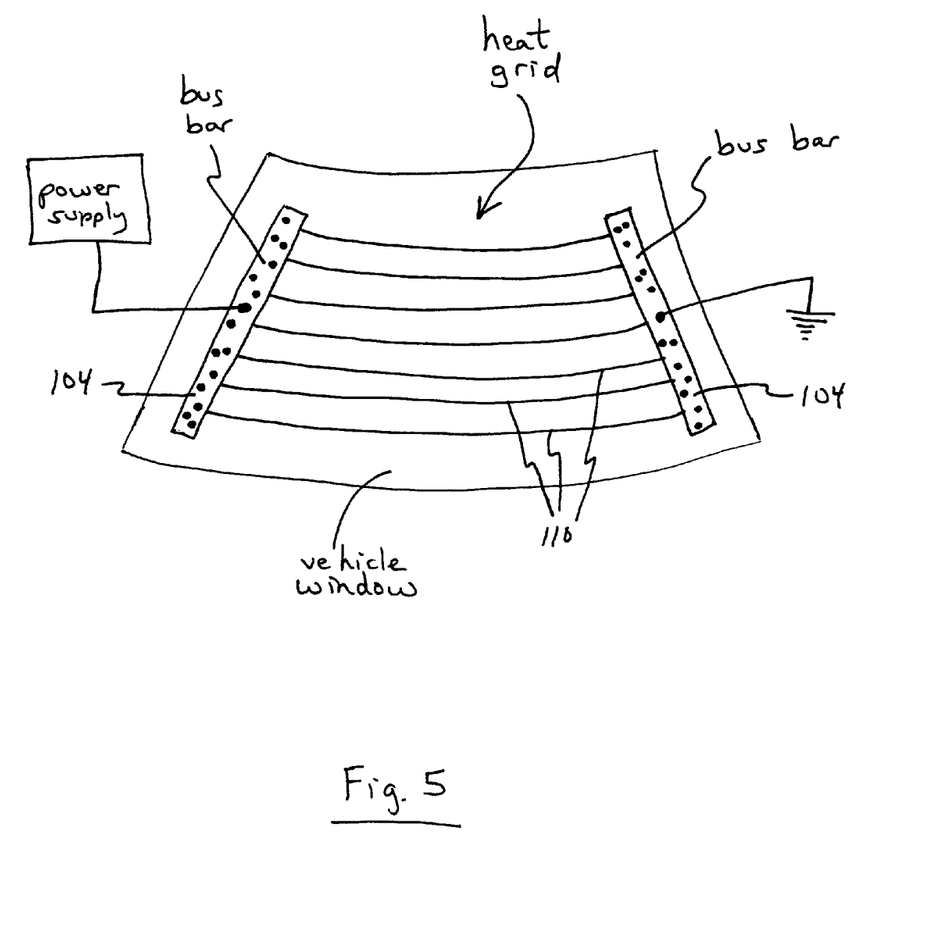
FIG. 5 is a plan view of a vehicle backlite according to an example embodiment of this invention.
Figure 6:
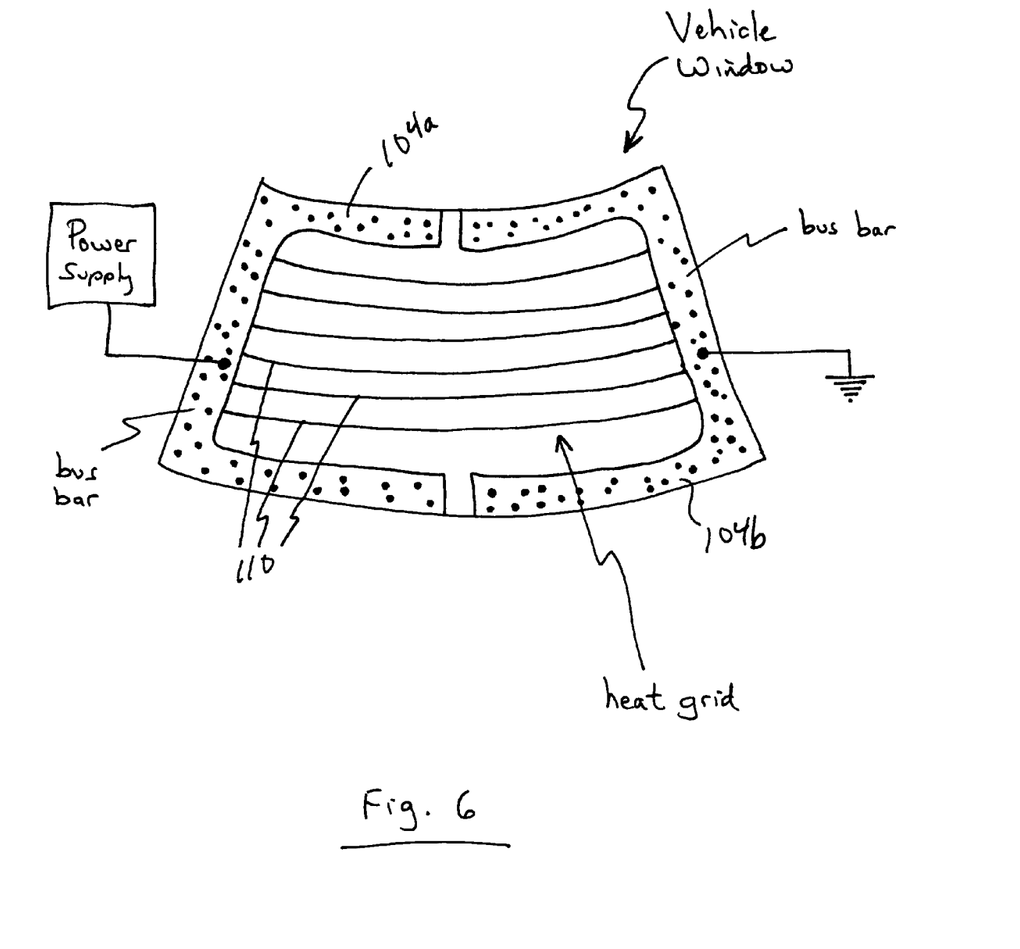
FIG. 6 is a plan view of a vehicle backlite according to another example embodiment of this invention.

FIG. 3(a) is a cross sectional view of a vehicle window (e.g., vehicle backlite) having a heatable conductive coating 102. The window includes glass substrate or glazing 100, which may be planar or bent in cross sectional shape. A heatable conductive coating 102 is provided on the glass substrate 100. The heatable conductive coating 102 may be of a single conductive layer of an electrically conductive material such as indium tin oxide (ITO), silver, chromium, or the like, or alternatively may be a multi-layer coating at least one layer of which is electrically conductive. The heatable conductive coating 102 may be transparent and continuously provided across a substantial portion of the substrate in certain example instances, or alternatively may take the form of a grid including a plurality of spaced apart approximately parallel lines which may be opaque or transparent as shown in FIGS. 5-6.

In certain example embodiments, the bus bar(s) 104 are made of conductive black frit. In certain example embodiments, the conductive black colored frit may include a material such as silver to make it electrically conductive. The conductive black frit may be made, for example, by adding black coloring pigment to conventional silver (Ag) inclusive frit based material, thereby resulting in a black colored conductive frit inclusive material which includes Ag particles. Thus, in certain example embodiments, the material of the bus bars 104 is composed of, or comprises, frit, silver, and black coloring pigment. The term "frit" as used herein is defined as one or more of: (a) material comprising silicon oxide; (b) the calcined and/or partly fused materials of which glass is made; and/or (c) any of various glasses ground to introduce other ingredients into glazes, enamels or the like. The definition of "frit" herein should be construed so as to cover each of these three instances (a), (b) and (c).

Bus bar(s) 104 are typically formed proximate opposite edges of the substrate (e.g., see FIGS. 5-6), and are electrically connected to different portions of heatable conductive coating 102. The bus bars 104 are thus used to supply current to the coating 102, thereby causing the coating to heat up and provide defogging and/or defrosting functions. As shown in FIG. 3(a), the bus bars 104 are typically formed on the interior surface of the substrate 100 in order to be electrically connected to coating 102 in certain example embodiments of this invention. In the FIG. 3(a) embodiment, the conductive heatable coating 102 is made of the same conductive material, and at the same time, as the bus bars 104; however, this invention is not so limited as shown for example in FIGS. 3(b)-(c).

Still referring to FIG. 3(a), the window further includes an opaque layer 106 formed on the interior major surface of the glass substrate 100. Opaque layer 106 may be composed of black frit paint, or a black colored ceramic, that is non-conductive in certain example embodiments of this invention. The purpose of this black non-conductive paint strip 106 is to hide from view (from the vehicle exterior) the edge of the sheet metal window frame proximate the edge of the glazing, and/or adhesive used to subsequently mount the glazing in the window frame. Opaque layer 106 may be provided on the interior surface 100b of the vehicle window around the entire window periphery (i.e., around all four sides) in certain example embodiments of this invention; or alternatively may be provided only along only one, two or three sides of the window periphery in other embodiments of this invention. In certain preferred embodiments, the opaque layer 106 is not provided in the central viewing area of the window, since the layer 106 is opaque and is intended to block visible light. While the opaque (e.g., black colored) layer 106 is shown on the interior surface of the vehicle window in the FIG. 3(a) embodiment, it is possible to instead provide opaque layer 106 on the exterior surface of the glazing 100. As still another option, such a layer 106 may be formed both on the inside and outside surfaces of the window, around the periphery as explained above.

Because the bus bar(s) 104 are of black colored conductive frit, they are difficult to see from the interior of the vehicle and blend in visually with similarly colored opaque layer 106 to a passenger of the vehicle. For instance, the black bus bar(s) 104 would blend in visually with a possible black painted non-conductive frit strip 106 painted on the surface 100*b* of the window proximate the periphery thereof. Thus, there is no need for black paint to be provided on the interior periphery surface of the window over the bus bars in certain example embodiments, because there is no need to hide the bus bar(s) from view. Thus, in certain example non-limiting instances, a processing step associated with forming a black paint layer/strip over the bus bars may be eliminated.

In certain example embodiments of this invention, the conductive heatable coating 102 (continuous in form, or alternatively in the form of a grid or matrix) may be deposited and formed prior to the deposition and formation of the bus bars 104, and may thus be of a conductive material different that that of the bus bars. In such instances, the heatable coating may be of, for example and without limitation, a conductive transparent ITO layer, a grid of conductive opaque metal inclusive approximately parallel strips, or the like. However, in other example embodiments of this invention, as shown in FIG. 3(*a*) for example, the conductive heatable coating 102 may be formed simultaneously with the bus bars 104 out of the same conductive material. In such example embodiments, a single pass may be used to form both the conductive black frit bus bars 104 (e.g., one adjacent each side of the interior surface of the window) and a conductive heatable grid of the same material on a surface of the glazing (e.g., see also FIG. 6).

Figure 3B:
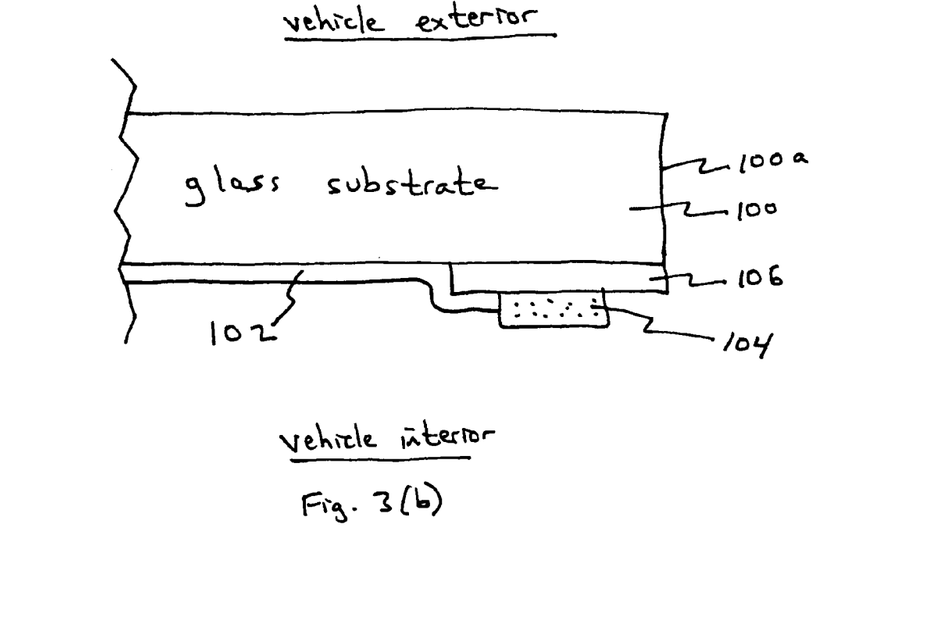

FIG. 3(*b*) is a cross sectional view of a heatable vehicle window according to another example embodiment of this invention. The FIG. 3(*b*) embodiment is similar to the FIG. 3(*a*) embodiment, except that in the FIG. 3(*b*) embodiment the bus bars 104 and the heatable coating 102 are formed of different materials and in different processing steps. The coating 102 may be formed under or over the black colored and opaque conductive bus bars 104 in different example instances.

Figure 3C:
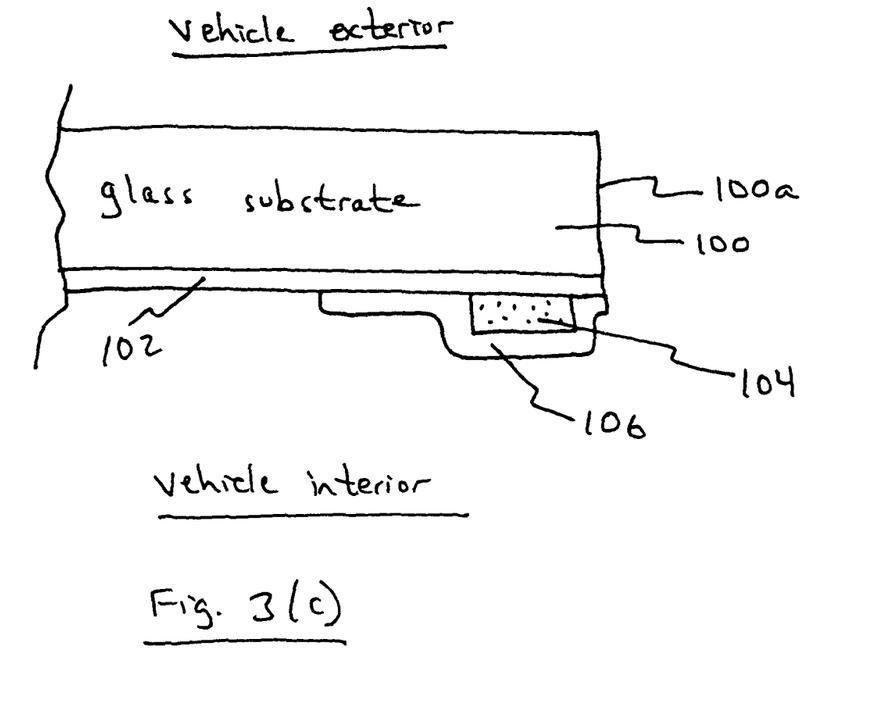

FIG. 3(*c*) is a cross sectional view of a heatable vehicle window according to another example embodiment of this invention. The FIG. 3(*c*) embodiment is similar to the FIG. 3(*a*) embodiment, except that (i) in the FIG. 3(*c*) embodiment the black colored opaque bus bars 104 and the heatable coating 102 are formed of different materials and in different processing steps, and (ii) the black colored non-conductive opaque layer 106 is formed over top of the bus bars 104 and/or the heatable coating 102 so that the bus bars 104 are located between the glass substrate 100 and the opaque layer 106.

In each of the aforesaid example embodiments, the bus bars 104 are typically located on a major surface (e.g., interior major surface) of the window proximate the periphery thereof, although they may be located in other possible locations in certain situations. The bus bars may also be used to function as a radio and/or cell phone antenna in certain example embodiments of this invention.

FIG. 5 illustrates an example embodiment of this invention, where the bus bars 104 are formed on the interior surface of the rear window of a vehicle adjacent opposite sides thereof, with a conductive grid of heatable conductors 110 provided therebetween. Thus, the conductive heatable coating 102 is composed of the grid of opaque conductors 110 in this embodiment. Each conductor 110 of the grid may be connected at one end thereof to a first bus bar 104, and at a second end thereof to a second bus bar 104 as shown in FIG. 5. One of the bus bars 104 may be connected to a power supply, and the other bus bar grounded, in order to provide current to the grid in order to heat the same. It is noted that the opaque layer 106 is not shown in FIG. 5 (or FIG. 6) for purposes of simplicity, even though it may be present on the surface of the window. In the FIG. 5 embodiment, the bus bars 104 and the heatable grid may be formed in different process steps at different times and thus may be of different conductive materials, or alternatively may be formed of the same conductive black colored material at the same time. It will be appreciated that each of the FIGS. 3(*a*), 3(*b*) and 3(*c*) embodiments may include bus bars 104 and a heatable coating arranged in the manner shown in FIG. 5.

FIG. 6 illustrates an example embodiment of this invention, where the bus bars 104 are formed directly on the interior surface of the rear window of a vehicle adjacent opposite sides thereof, with a conductive grid of heatable conductors 110 provided therebetween. Thus, the conductive heatable coating 102 is composed of the grid of opaque conductors 110 in this embodiment. In the FIG. 6 embodiment, the conductive heatable grid of conductors 110 may be formed simultaneously with the bus bars 104 out of the same material (i.e., black colored frit with Ag or other metal particles therein for conductivity). For example, a single pass or processing step may be used to form both the conductive black frit bus bars 104 shown in FIG. 6 and a conductive heatable grid of conductors 110 of the same material on a surface of the glazing. Moreover, in the FIG. 6 embodiment, no black non-conductive enamel layer 106 is needed under the bus bars because the bus bars are formed sufficiently wide so as to replace the function of the typical underlying black enamel layer (i.e., the black bus bars themselves are formed sufficiently wide to hide at least part of the window frame adjacent the window edge from the vehicle exterior, and/or to hide adhesive used to attached the window to the window frame).

In the FIG. 5 embodiment, each bus bar 104 is approximately linear in shape, and each is provided along only one side of the window. In contrast, in the FIG. 6 embodiment bus bar 104*a* may optionally be substantially C-shaped, and bus bar 104*b* may also optionally be substantially shaped in the form of an inverted C. Moreover, in the FIG. 6 embodiment, each bus bar may be located along three different sides of the window (i.e., a top side, a bottom side, and a right or left side). In other example embodiments of this invention, bus bar 104*a* may be substantially L-shaped, and bus bar 104*b* substantially shaped in the form of an inverted L. Other shapes are also possible.

Figure 4:
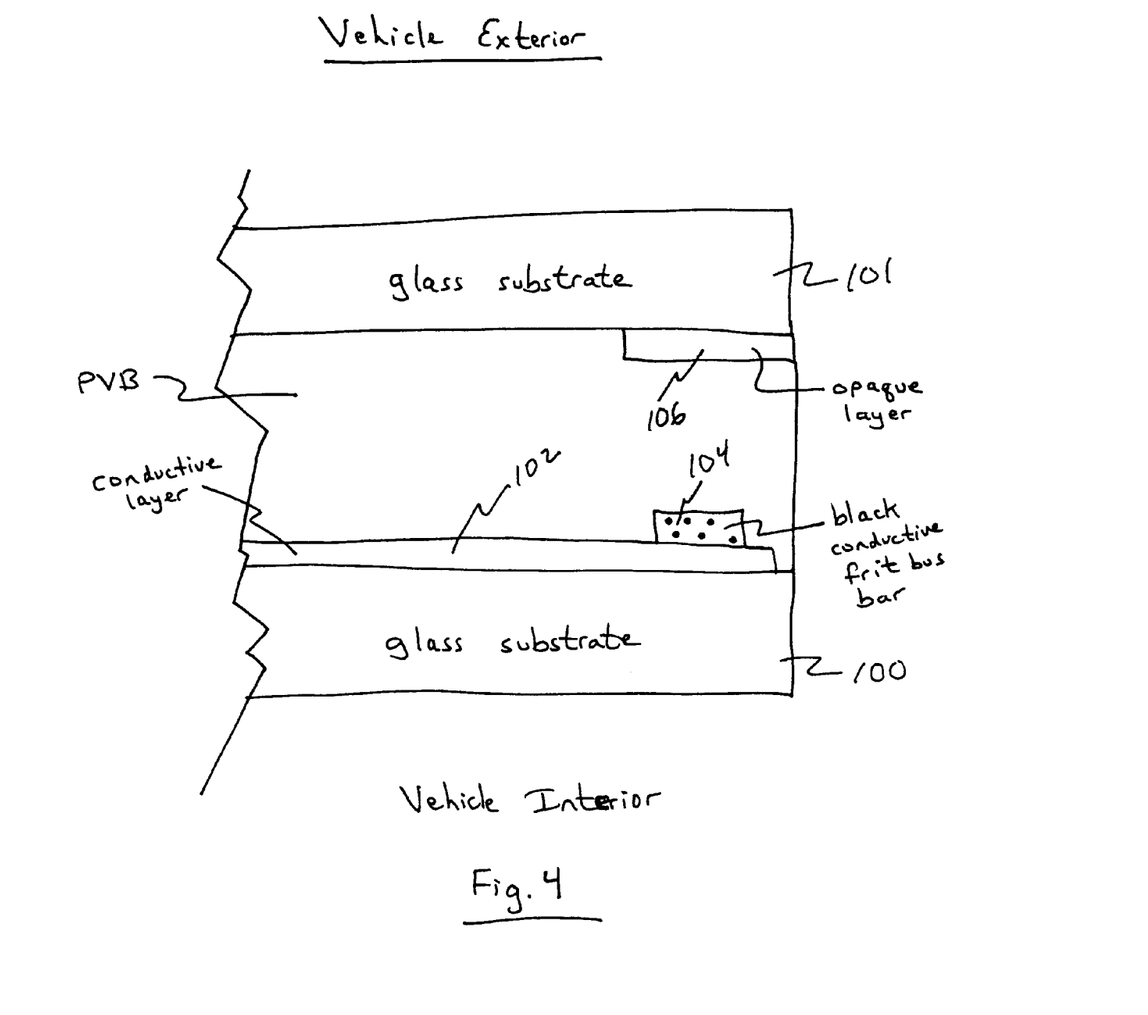
FIG. 4 is a cross sectional view of a laminated vehicle windshield according to an example embodiment of this invention.

While FIG. 3 illustrates a monolithic window, the FIG. 4 embodiment relates to a laminated window according to an example embodiment of this invention. In the FIG. 4 embodiment, the laminated window includes first glass substrate 100 and second glass or plastic substrate 101 which are laminated to one another via a PVB or other polymer inclusive interlayer. Coating 102, such as a multi-layer coating with at least one conductive layer, is formed on the interior surface of one of the substrates, as are first and second bus bars 104 (only one of which is shown in FIG. 4). Of course, the bus bars and heatable coating 102 are formed on the same substrate. Non-conductive opaque layer 106 is provided for the same reasons discussed above. As with the other example embodiments herein, one or both of the bus bars 104 is/are composed of, or comprise, black or dark colored conductive material which may include frit and/or a conductive material such as silver to make it electrically conductive. As other alternatives of laminated windows according to example embodiments of this invention, the interior glass substrate of a laminated window may be of any of the substrates shown in any of FIG. 3(*a*), 3(*b*), or 3(*c*) along with the other elements shown in those figures.

The bus bars 104 may be formed in any suitable manner in the embodiments of this invention. For example, and without limitation, the conductive bus bars 104 may be formed by using a silk-screen and/or printing process in certain example embodiments of this invention. In any event, the bus bars 104 typically comprise conductive material in an amount sufficient so as to be electrically conductive, and frit, and are typically black in color due to black color pigment therein. However, other similar colors may be used for the bus bars in other example instances.

Vehicle windows according to certain example embodiments of this invention have a visible transmission of at least about 50%, more preferably of at least about 60%, and most preferably of at least about 70%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A heatable vehicle window, comprising:
    a glass substrate supporting a heatable conductor;
    first and second conductive bus bars electrically connected to the heatable conductor, each of the first and second bus bars being located electrically between the heatable conductor and a respective conductive lead;
    wherein the heatable conductor is substantially transparent and extends across a central portion of the window including across a substantial portion of a width and length of the window, and wherein the first bus bar and the second bus bar comprise conductive material and frit, and are black in color; and
    wherein the heatable conductor and the bus bars are provided on a first major surface of the glass substrate at least partially over and directly contacting a non-conductive black colored layer that is also provided on the glass substrate, and wherein the non-conductive black colored layer is provided along at least one side area of the glass substrate and is not located in a central area of the window.

2. The heatable vehicle window of claim 1, wherein the first and second bus bars comprise Ag particles and black coloring pigment, and are opaque.

3. The heatable window of claim 1, wherein the non-conductive black colored layer is provided along all four sides of the window.

4. The heatable window of claim 1, wherein the non-conductive black colored layer comprises a non-conductive enamel.

5. The heatable window of claim 1, wherein the first and second bus bars, which are black colored, are made of a material comprising $SiO_2$ and Ag.

6. The heatable window of claim 1, wherein the first and second bus bars, which are black in color, comprise Ag particles dispersed therein for conductivity purposes.

7. The heatable window of claim 1, wherein the window is a backlite of a vehicle.

8. The heatable window of claim 1, wherein the first and second bus bars, which are black in color, are opaque and block transmission of visible light.

9. The heatable window of claim 1, wherein each of the first and second bus bars is black in color and comprises both conductive material and frit.

10. The heatable window of claim 1, wherein the first and second bus bars are all formed of the same material, and are black in color.

11. The heatable window of claim 1, wherein the first bus bar is substantially C-shaped, and the second bus bar is substantially shaped as an inverted C.

12. The heatable window of claim 1, wherein at least one of the first and second bus bars is substantially linear in shape.

13. The heatable window of claim 1, wherein the window is a monolithic window.

14. The heatable window of claim 1, wherein the window is a laminated window including a pair of substrates laminated to one another via a polymer inclusive interlayer.

15. The heatable window of claim 1, wherein no opaque layer is provided on a major interior surface of the window over the bus bars for hiding the bus bars from view.

16. The heatable window of claim 1, wherein the first and second bus bars each comprise a conductive material and black color pigment, so that each of the first and second bus bars is substantially black in color.

17. The heatable window of claim 1, wherein the window has a visible transmission of at least 60%.

* * * * *